United States Patent [19]

Markowitz

[11] 3,754,265
[45] Aug. 21, 1973

[54] SIGNAL PROCESSING MEANS AND METHOD
[75] Inventor: Raymond S. Markowitz, Wyncote, Pa.
[73] Assignee: American Electronic Laboratories, Inc., Colmar, Pa.
[22] Filed: Nov. 26, 1971
[21] Appl. No.: 202,515

[52] U.S. Cl. ............................... 343/119, 343/123
[51] Int. Cl. ............................................. G01s 3/18
[58] Field of Search ............................ 343/119, 123

[56] References Cited
UNITED STATES PATENTS
3,588,900  6/1971  Salmet ......................... 343/120 X Primary Examiner—Benjamin A. Borchelt
Assistant Examiner—Richard E. Berger
Attorney—Jacob Trachtman

[57] ABSTRACT

A signal processing means and method in which a plurality of orthogonally disposed directional radio frequency signal receiving means, each deliver an output signal proportional to the magnitude of the directional component of a received electromagnetic signal corresponding its directional disposition, a signal converting means receives signals from said directional receiving means and delivers an output signal which is a predetermined function of said signals, a function generating means produces an output signal which is a tangent function of angle $\theta'$, and a signal comparing means receives the output signals from said converting means and said function generating means and delivers an output signal when its said input signals have a predetermined relationship. A gating means delivers output signals from said directional receiving means in response to the delivery of an output signal from said signal comparing means, thereby delivering output signals from said directional receiving means to correspond with a received electromagnetic signal having a direction $\theta$ corresponding to the angle $\theta'$ of the tangent function being generated by the function generating means.

18 Claims, 5 Drawing Figures

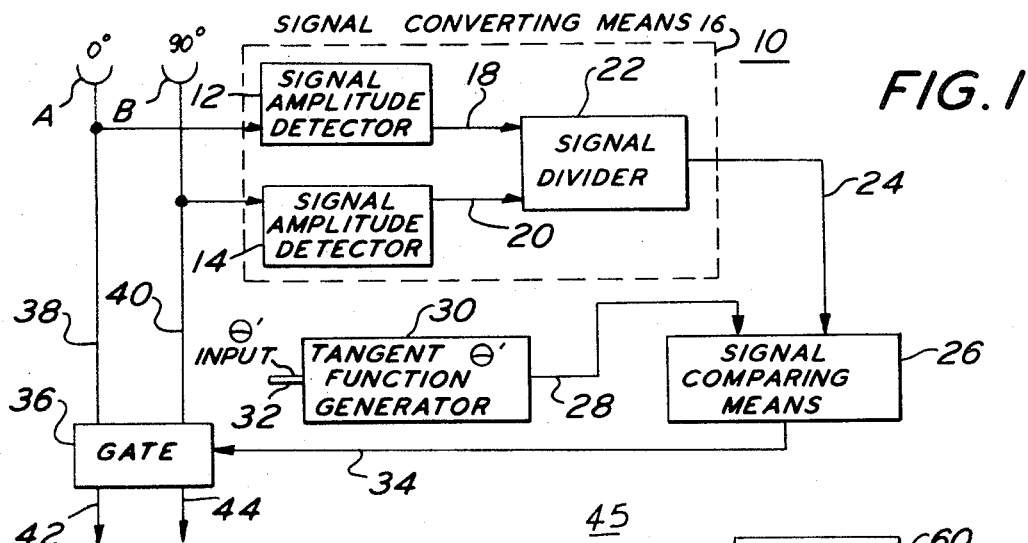
FIG.1
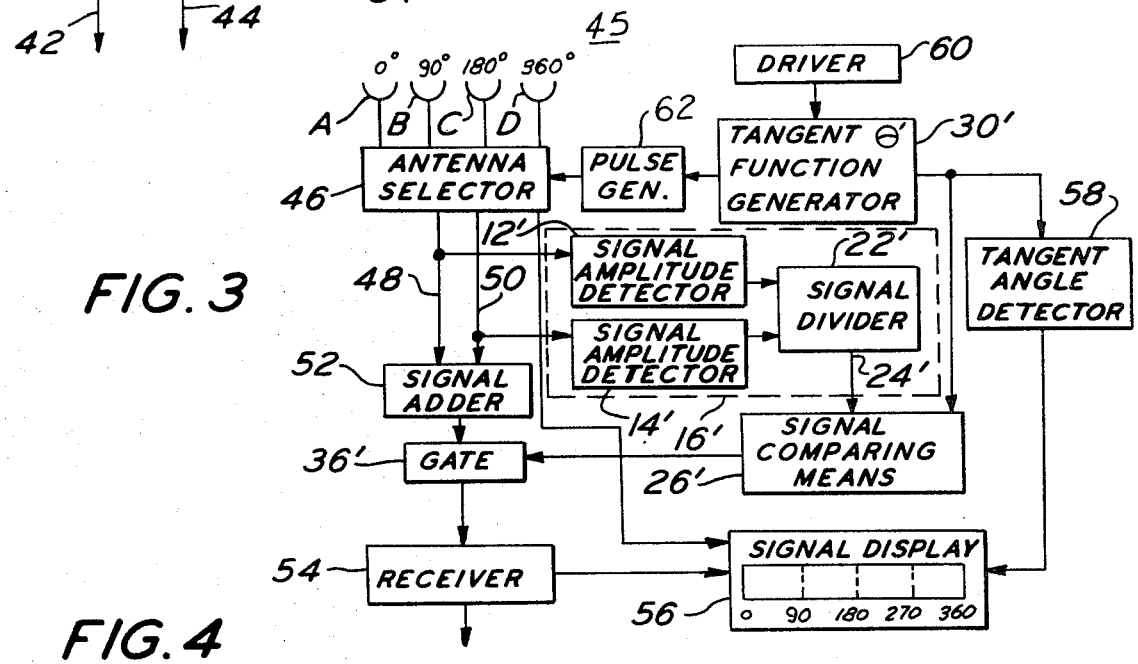
FIG.3
FIG.4
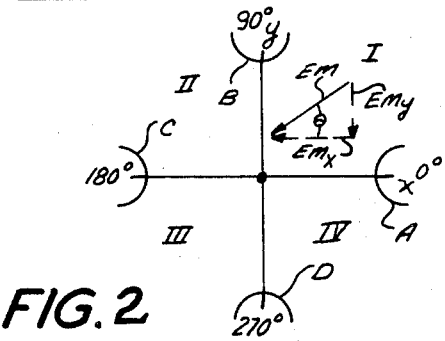
FIG.2
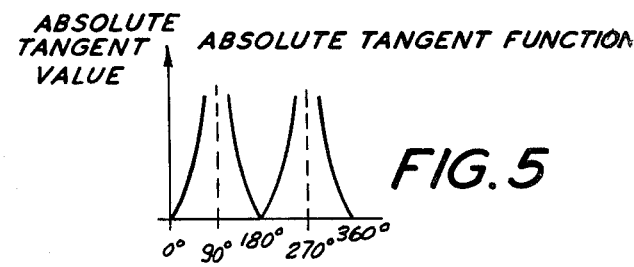
FIG.5

SIGNAL PROCESSING MEANS AND METHOD

The invention relates to a signal processing means and method, and more particularly to a means and method providing a synthesized azimuthal beam of narrow width to simulate a rotating antenna, in a system employing a fixed antenna array for the purpose of signal resolution and reduction of signal density.

Heretofore, movable directional antennas and antenna arrays have been utilized for obtaining information as to directions of electromagnetic signals and for selecting and displaying signals received from different directions. The present invention provides a simplified system whereby an array of fixed directional antennas are utilized with means to simulate a directional rotating antenna with a synthesized azimuthal beam width to provide high signal resolution. The method and means of the invention, thus, by electrical means, allows the reduction of signal density, the selection of signals arriving from a selected direction, and the receipt and display of signals as a function of their direction, amplitude and time.

A principal object of the invention, therefore, is to provide a new and improved signal processing means and method utilizing a fixed signal array with a synthesized azimuthal beam of narrow width simulating a directional rotating antenna.

Another object of the invention is to provide a new and improved signal processing means and method providing high signal resolution and reduction of signal density for electromagnetic signals arriving at the antenna array.

Another object of the invention to provide a new and improved signal processing means and method employing four quadrature antennas with a power pattern of approximately a cosine squared function, for simulating a rotating antenna and providing a synthesized beam of narrow width giving high signal and directional resolution.

Another object of the invention is to provide a new and improved signal processing means and method allowing ready control of the direction of a synthesized beam for receiving pulse signals at a selected bearing angle.

Another object of the invention is to provide a new and improved signal processing means and method with a synthesized azimuthal beam which may be electrically rotated at a high rate to provide information with respect to electromagnetic signals at the antenna array with respect to direction as a function of time.

Another object of the invention is to provide a new and improved signal processing means and method which is simple and highly effective in operation.

The above objects as well as many other objects of the invention are achieved by providing a signal processing means and method in which a plurality of orthogonally disposed directional radio frequency signal means are provided, each delivering an output signal proportional to the magnitude of the directional component of an electromagnetic signal corresponding to its directional disposition. A signal converting means receives signals from the directional receiving means and delivers an output signal which is a predetermined function of the signals. A function generating means produces an output signal which is a tangent function of the angle $\theta'$, and a signal comparing means receives the output signals from the converting means and the function generating means and delivers an output signal when its input signals have a predetermined relationship. A gating means receives output signals from the comparing means and delivers output signals from the directional receiving means responsive to the delivery of an output signal from the signal comparing means, thereby delivering output signals from the directional receiving means to correspond with a received electromagnetic signal having a directional angle $\theta$ corresponding with the angle $\theta'$ of the tangent function being generated by the function generating means.

The method of the invention is carried out by deriving a first signal proportional to the direction and magnitude of an electromagnetic signal with respect to a first direction, deriving a second signal proportional to the direction and magnitude of the electromagnetic signal with respect to a second direction which is nonparallel to the first direction, producing a signal which is a function of the first and second signals, while comparing the produced signal with a selected signal and delivering the electromagnetic signal when the produced signal corresponds to the selected signal.

The foregoing and other objects of the invention will become more apparent as the following detailed description of the invention is read in conjunction with the drawing, in which:

FIG. 1 is a block diagram illustrating the invention,

FIG. 2 is a quadrant diagram illustrating the arrangement of the directional radio frequency signal receiving means, FIG. 3 is a block diagram of a modified and expanded form of the embodiment of the invention illustrated in FIG. 1, FIG. 4 is a table illustrating the relationship between the quadrants of FIG. 2 and the directional receiving means producing information relating to the respective quadrants, and FIG. 5 is a graph illustrating the absolute tangent function of angle utilized in connection with the invention.

Like reference numerals designate like parts throughout the several views.

Refer to FIG. 1 which illustrates a signal processing means 10, which is an embodiment of the invention. A pair of directional antennas A and B of the means 10 with a power pattern which may approximate a cosine squared function are provided for receiving radio frequency signals which may include pulse signals as well as continuous signals. The antennas A and B are positioned so that they respectively deliver maximum signal amplitudes for respective signals displaced 90° from one another. Thus, if the antenna A were directed due north, the antenna B could be directed due west to achieve this relationship. The radio frequency signals provided by the antenna A are delivered to a signal amplitude detector 12, while the signals from the antenna B are delivered to the signal amplitude detector 14 of a signal converting means 16. The signal amplitude detectors 12 and 14 may comprise rectifiers, each delivering an output signal on respective lines 18, 20 with an amplitude corresponding to the respective amplitudes of the radio frequency signals delivered to the detectors 12 and 14. The detectors 12 and 14, of course can also be of the type providing output signals on lines 18 and 20 in digital form representing such amplitudes.

A signal divider 22 of the converting means 16 receives the signals delivered to the lines 18 and 20 and delivers an output signal on the line 24 which represents the quotient of the input signals in the form in which the value represented by the input signal on line 20 is divided by the value represented by the input signal present on line 18 of the detectors 14 and 12. The output signal from the signal divider 22 may be in analog form representing the quotient by amplitude, or may be presented in digital form.

The information from the signal converting means 16 is delivered over line 24 to the input of a signal comparing means 26 which also receives an input signal over a line 28 from a tangent $\theta'$ function generator 30. The function generator 30 may also be provided with an input 32 for controlling the angle $\theta'$ for which the tangent function signal is produced by the function generator 30.

The signal comparing means 26 may be of the analog or digital type, and produces an output signal on the line 34 when the input signals have a predetermined relationship to each other. Also, the comparing means 26 can be conditioned to operate with different degrees of precision. Thus, the comparing means 26 can be made to deliver an output signal over line 34 to gate 36 when the signals to the signal comparing means represent input values which are selected to be (a) near equal, (b) substantially equal, or (c) coincident, thereby determining the simulated beam width of the means 10.

The gate 36 receives signals from the antennas A and B at its input over the respective lines 38 and 40 and passes the signals respectively to its output lines 42 and 44 upon receipt of a gating signal over the line 34 from the signal comparing means 26.

In operation the signal processing means 10 is effective for selecting signals for delivery to the output lines 42, 44 of the gate 36 corresponding to the angle $\theta'$ of the tangent function produced by function generator 30 between the angles 0° and 90° extending between the orthongally disposed antennas A and B. Thus, as the tangent function of the generator 30 is varied to correspond to selected values of the angle $\theta'$, only those signals which arrive at the antennas A and B from the selected corresponding angle $\theta$ will be passed by the gate 36 to the output lines 42 and 44.

For further clarification refer to FIG. 2 which represents the antennas A and B of the signal processing means 10 in the upper right hand quadrant I. An electromagnetic signal EM arriving at any angular direction $\theta$ with the $x$ axis, and which is neither parallel to the $x$ axis or $y$ axis, will have $x$ and $y$ components respectively, namely $EM_x$ and $EM_y$. Since the antennas A and B are directional along the positive $x$ and $y$ axes, the component $EM_x$ of the electromagnetic signal EM will result in the production of a signal by the antenna A which is proportional to the component $EM_x$, while the antenna B will produce an output signal which is proportional to the $EM_y$ component. On the other hand, the components $EM_x$ and $EM_y$ of the electromagnetic signal EM which are orthogonal to the respective directions of the antennas B and A will have no effect on the production of output signals by such antennas.

The signal detectors 12 and 14 of the signal converting means 16 operate to deliver output signals proportional to the amplitudes of the respective components $EM_x$ and $EM_y$ of the electromagnetic signal EM, which are then processed by the signal divider 22 which divides the amplitude value of the component $EM_y$ by the amplitude value of the component $EM_x$ and delivers a signal representing the quotient. From this, it is evident that the signal delivered by the converting means 16 is a tangent function of the angle $\theta$ which the electromagnetic signal EM makes with the $x$ axis. The tangent $\theta'$ function generator 30 also delivers to the signal comparing means 26, a tangent function which corresponds to a selected angle $\theta'$. Thus, only when the signals, which may be pulse signals of short duration, received by the antennas A and B arrive at a directional angle $\theta$ with the $x$ axis, which angle $\theta$ corresponds to the angle $\theta'$ of the tangent function delivered by the function generator 30, will such signals be passed by the gate 36. Of course, by varying the output signal from the tangent function generator 30, the signals received by the antennas A and B may be selected as a function of time. The angle $\theta'$ of the tangent function may be, as desired, varied linearly or otherwise as a function of time.

The effect of the signal processing means and method is to sythesize an azimuthal beam to simulate a rotating antenna in a system employing fixed antennas. High resolution is achieved by providing a narrow simulated beam width providing a bearing accuracy of better than 5°, by controlling the conditions under which the signal comparing means 26 delivers an output signal to line 34. If the signal comparing means 26 allows control of the relationship between the input signals which will cause the delivery of a gating signal to line 34, the beam width may be correspondingly controlled. Thus the beam width can be narrowed and made more precise as the range within which the input signals must correspond is narrowed and vice versa. In this manner, if the input signals to the signal comparing means 26 must be identical to within a selected percentage variation, the beam width may be accurately controlled. High precision and increased narrowness of the beam width may be achieved by using a digital signal comparing means 26 in which the input signals must coincide identically for producing an output gating signal. However, there is a limit to the narrowness of the beam width which can be achieved and practical considerations also determine the beam width which may be desirable for particular uses.

It is also noted that the tangent function generator 30 can be provided so that it produces a discontinuous series of output signals for selected values of the tangent function. Thereby, only selected directions may be monitored in a predetermined sequence or selectively without scanning the simulated beam through intermediate angular values as required by mechanical scanning means in which the antenna is rotated. This greatly increases efficiency and eliminates scanning of undesired regions.

FIG. 3 is a block diagram of a modified form of signal processing means 45 embodying the invention, which is expanded over the means 10 to include four orthogonally arranged antennas A, B, C and D. By reference to FIG. 2, it is again noted that antennas A and B, are respectively directed along the positive $x$ axis and $y$ axis. The directional antenna C is directed along the negative $x$ axis, and the directional antenna D is directed along the negative $y$ axis. The antenna C is displaced 90° from the antenna B and 180° from the antenna A, while the antenna D is displaced 90° from the antenna C, 180° from the antenna B, and 270° from the antenna A, measuring in the conventional counterclockwise direction. The antennas A and B are on the axes providing the quadrant I, while the antennas B and C are on the axes forming the quadrant II, the antennas C and D are on the axes forming the quadrant III and the antennas D and A are on the axes providing the quadrant IV. This arrangement corresponds, for example, to the antennas A, B, C and D being respectively directed to point due East, North, West and South.

The signals derived by the antennas A, B, C and D are delivered individually to an antenna selector 46 which has a pair of output lines 48 50. The signals from the lines 48 and 50 respectively are delivered to the inputs of the signal amplitude detectors 12' and 14' of the signal converting means 16'. The outputs of the detectors 12' and 14' are delivered to the inputs of the signal divider 22' which delivers a signal over the output line 24' to the signal comparing means 26'. The signal comparing means 26' also receives an input signal from the tangent $\theta'$ function generator 30' and delivers an output signal to the gate 36'. The gate 36' receives an input signal from the output of the signal adder 52 which derives its input signals over the lines 48 and 50 from the antenna selector 46. The output from the gate 36' is delivered to a receiver 54 which delivers output information which may be further processed. The receiver 54 may also include a signal display means 56. The signal display 56 in addition to receiving the signal from the receiver 54 may also receive an output signal from the antenna selector 46 and a signal from the function generator 30' through a tangent angle detector 58. The tangent detector provides an inverse function of the tangent function corresponding to the value of the angle $\theta'$.

In operation the tangent function generator 30' may be actuated by a driver 60 which may take various forms. Thus if the function generator 30' is of the digital type, the driver 60 may provide pulses to the function generator 30' to control the output signal. The driver 60, in such manner, may continuously vary the angle $\theta'$ of the tangent function in a linear, nonlinear or discontinuous manner for which the driver 60 can be programed.

On the other hand, the tangent $\theta'$ generator 30' may comprise a variable resistor with a rotatable shaft which may be rotated to generate the desired tangent function, and the driver may include motor means for continuously, or discontinuously varying or selecting the values of the tangent function 30'.

The tangent function generator 30', for the purpose of the present embodiment illustrated, rather than producing the tangent function for the four quadrants representing 360°, produces the absolute tangent function. Thus the tangent function which would be negative for the quadrant II and IV are produced as positive signals as illustrated in the graph of FIG. 5.

When the tangent function provided by the function generator 30' is in the quadrant I corresponding to the operating range for signals detected by the antennas A and B, the antenna selector 46 delivers signals from the antennas A and B respectively to its output lines 48 and 50. This corresponds to the arrangement of the signal processing means 10 illustrated in FIG. 1. The signal processing means 45, under such circumstances, operates in a similar manner to deliver the signals from the antennas A and B to the signal converting means 16'. The signal comparing means 26' also acts to deliver a gating signal 36' when its input signals correspond in value. The signals on line 48 and 50 derived from the antennas A and B are added by the adder 52 delivering its output signal to the gate 36'. Since the signals on lines 48 and 50 are the $EM_x$ and $EM_y$ components of the electromagnetic signal EM, the total signal EM is delivered by the adder 52 to the gate 36'. When the input signals to the gate 36' corresponds to the selected directional angle $\theta'$ the gate 36 passes same to the receiver 54.

The signal display means 56 which also receives the signal from the receiver 54 provides a panoramic visual display. The signal from the antenna selector 46 delivers information with respect to the condition of the antenna selector 46, thereby determining the quadrant or angular range for the signals to be displayed, while the signal from the tangent angle detector 58 provides a signal giving the angle $\theta'$ at which the signal is received within the selected quadrant.

As the angle $\theta'$ of the tangent function provided by the function generator 30' changes from one quadrant to another, an output signal is delivered by the generator 30' to the pulse generator 62 which delivers an actuating pulse to the antenna selector 46. The antenna selector 46 may comprise a four position switch which may be stepped from one position to the next by receiving a pulse signal, or any other such device responsive to such control. Thus, when the function generator 30' delivers an output signal which is in the quadrant II the antenna selector 46 is switched so that the signals from antenna B are delivered to output line 48 and the signals from antenna C are delivered to output line 50 of the antenna selector 46. The chart of FIG. 4 shows the angular range for each of the four quadrants and the antennas which respectively have their output signals delivered by the antenna selector 46 to the lines 48 and 50 in correspondence thereto.

Thus by changing the tangent function and switching the antenna selector 46 to correspond to the quadrant of the angle $\theta'$, the signal processing means 45 can selectively deliver output signals for a corresponding selected angular direction $\theta$ of received electromagnetic signals EM.

By sweeping the output signal produced by the tangent function generator 30' through the angle $\theta'$ ranging from 0° to 360°, signals from any azimuthal direction $\theta$ may be detected and selected. The signal display 56 may thus provide a panoramic display of all signals being received over the entire angular range at the antenna array, while indicating the presence of all such signals and their angular disposition. Of course, the means and method may be utilized for searching purposes as well as eliminating all signals except those particularly received from a desired direction.

It will be obvious to those skilled in the art that the invention may find wide application with appropriate modification to meet the individual design circumstances, but without substantial departure from the essence of the invention.

What is claimed is:

1. A signal processing means comprising first directional radio frequency signal receiving means for providing an output signal proportional to the magnitude of the directional component of a received electromagnetic signal corresponding to a first predetermined fixed direction, second directional radio frequency receiving means for providing an output signal proportional to the magnitude of the directional component of the received electromagnetic signals corresponding to a second predetermined fixed direction which is nonparallel to the first direction of said first directional receiving means, signal converting means receiving the signals from said first and second directional radio frequency signal receiving means and delivering an output signal responsive thereto, function generating means providing an output signal, and signal comparing means receiving the output signals from said converting means and said generating means and delivering output signals.

2. A signal processing means comprising first directional radio frequency signal receiving means for providing an output signal proportional to the magnitude of the directional component of a received electromagnetic signal corresponding to a first direction, second directional radio frequency receiving means for providing an output signal proportional to the magnitude of the directional component of the received electromagnetic signals corresponding to a second direction which is nonparallel to the first direction of said first directional receiving means, signal converting means receiving the signals from said first and second directional radio frequency signal receiving means and delivering an output signal responsive thereto, function generating means providing an output signal, signal comparing means receiving the output signals from said converting means and said generating means and delivering output signals, and gating means receiving output signals from said signal comparing means and the output signals from said first and second directional radio frequency signal receiving means and transmitting said output signals received from said first and second directional receiving means responsive to the delivery of an output signal from said signal comparing means.

3. A signal processing means comprising first directional radio frequency signal receiving means for providing an output signal proportional to the magnitude of the directional component of a received electromagnetic signal corresponding to a first direction, second directional radio frequency receiving means for providing an output signal proportional to the magnitude of the directional component of the received electromagnetic signals corresponding to a second direction which is nonparallel to the first direction of said first directional receiving means, signal converting means receiving the signals from said first and second directional radio frequency signal receiving means and delivering an output signal responsive thereto, function generating means providing an output signal, and signal comparing means receiving the output signals from said converting means and said generating means and delivering output signals, said converting means including first and second means each delivering an output signal responsive respectively to the amplitudes of the pair of output signals of said pair of directional radio frequency signal receiving means, and dividing means delivering an output signal corresponding to the quotient resulting from the division of one by the other of said amplitudes.

4. The means of claim 3 in which the output signal of said dividing means has an amplitude corresponding to said quotient, and said function generating means provides an amplitude modulated output signal.

5. The means of claim 4 in which said comparing means provides an output signal when the amplitude of the output signal from said dividing means has a predetermined relationship to the amplitude of the output signal from said function generating means.

6. The means of claim 3 in which the second direction of said second directional radio frequency receiving means is displaced 90° from the first direction of said first directional radio frequency receiving means, and the function generator means provides an output signal corresponding to a tangent function and said signal comparing means provides an output signal when its input signals have a predetermined relationship.

7. The means of claim 6 including gating means receiving the output signals from said directional radio frequency signal receiving means responsive to the delivery of an output signal from said signal comparing means.

8. The means of claim 7 including driving means for controlling the output signal of said function generating means.

9. The means of claim 8 including third directional radio frequency signal receiving means for providing output signals proportional to the magnitude of the directional component of a received electromagnetic signal corresponding to a third direction which is displaced 180° from the first direction and 90° from the second direction of said respective first and second directional radio frequency receiving means, and a fourth directional radio frequency signal receiving means for providing output signals proportional to the magnitude of the directional component of the received electromagnetic signals corresponding to a fourth direction which is displaced 270° from the first direction, 180° from the second direction and 90° from the third direction of said respective first, second and third directional radio frequency receiving means, and signal selecting means delivering output signals from a selected adjacent pair of said directional radio frequency signal receiving means, each of said adjacent pairs of said directional radio frequency signal receiving means respectively corresponding to first, second, third and fourth quadrants.

10. The means of claim 9 in which said driving means energizes said generating means to sequentially provide first, second, third and fourth quadrant tangent functions and said signal selecting means includes switching meanS periodically actuated by said driving means to deliver signals from adjacent pairs of directional radio frequency signal receiving means corresponding to the quadrant of the tangent signal being provided by the function generating means to said signal comparing means.

11. The means of claim 10 including signal receiver for receiving the output signals from said gating means and the tangent signal from said function generating means, and providing said output signals in correlation to the directions from which they are received.

12. The means of claim 11 in which said drive means energizes said function generating means to provide a tangent function of angle which scans between 0° and 360°, and said signal receiver provides a panoramic display of the received signals with respect to the directional angle at which they are received.

13. Method of signal processing including the steps of
 a. deriving a first signal proportional to the direction and magnitude of an electromagnetic signal with respect to a first direction b. deriving a second signal proportional to the direction and magnitude of said electromagnetic signal with respect to a second directiOn which is nonparallel to the first direction
c. producing a signal which is a function of said first and second signals
d. comparing said produced signal with a a selected signal
e. and delivering the electromagnetic signal when the produced signal corresponds with said selected signal.

14. The method of claim 13 in which the first and second signals are derived respectively by first and second radio frequency receiving means, and the produced signal corresponds to the quotient resulting from the division of the amplitude of one derived signal by the amplitude of the other derived signal.

15. The method of claim 14 in which said first and second radio frequency receiving means are directional delivering maximum signals respectively corresponding with said first and second directions of said first and second derived signals, said first and second directions are displaced 90° from each other, and said selected signal is derived from a tangent function of angle $\theta'$, whereby the electromagnetic signal delivered has an angular direction $\theta$ corresponding to the tangent angle $\theta'$ of the selected signal.

16. The method of claim 15 which includes the step of scanning the electromagnetic signals received by said first and second directional electromagnetic radio frequency signal receiving means by varying the selected signal as a function of time and delivering said electromagnetic signals as a function of time and angle $\theta$ corresponding to direction.

17. The method of claim 15 including the steps of deriving third and fourth signals each respectively proportional to the direction and magnitude of an electromagnetic signal with respect to third and fourth directions which are each respectively displaced 180° from said first and second directions, said third and fourth signals being derived respectively by third and fourth radio frequency receiving means in which the direction of maximum derived signals respectively correspond with said third and fourth directions, and the selected signal is derived from a tangent function of angle $\theta'$ between 0° and 360°, whereby the electromagnetic signal delivered has an angular direction $\theta$ corresponding to the tangent angle $\theta'$ of the selected signal.

18. The method of claim 17 which includes the step of scanning the electromagnetic signals received by said first, second, third and fourth directional electromagnetic radio frequency receiving means by varying the selected signal as a function of time and delivering said electromagnetic signals as a function of time and angle $\theta$ corresponding to direction.

* * * * *